No. 878,904. PATENTED FEB. 11, 1908.
E. E. SLICK.
VALVE.
APPLICATION FILED APR. 12, 1907.

3 SHEETS—SHEET 2.

WITNESSES
INVENTOR

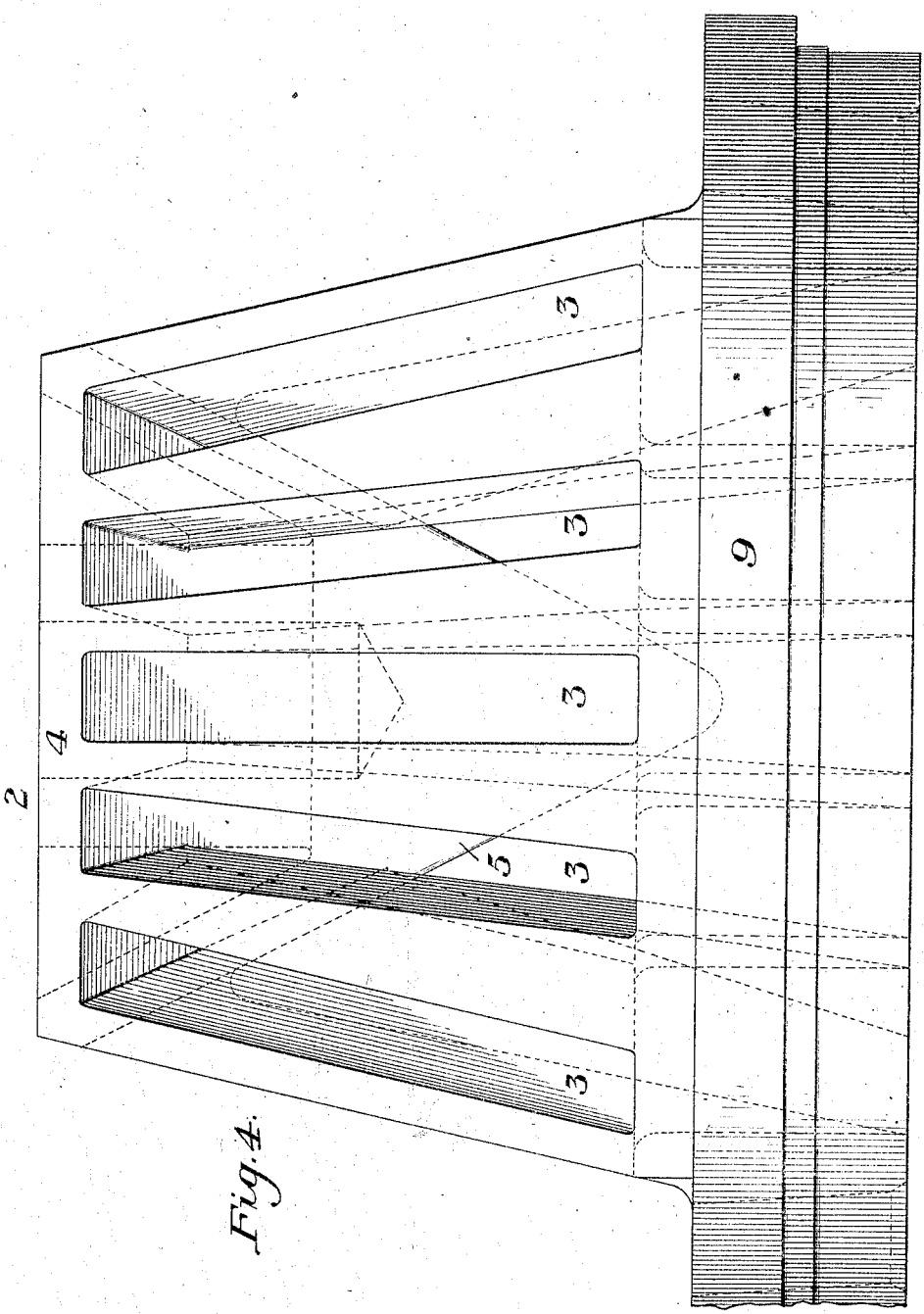

UNITED STATES PATENT OFFICE.

EDWIN E. SLICK, OF PITTSBURG, PENNSYLVANIA.

VALVE.

No. 878,904.  Specification of Letters Patent.  Patented Feb. 11, 1908.

Application filed April 12, 1907. Serial No. 367,856.

*To all whom it may concern:*

Be it known that I, EDWIN E. SLICK, of Pittsburg, Allegheny county, Pennsylvania, have invented a new and useful Valve, of which the following is a full, clear, and exact description, reference being had to the accompanying drawings, forming part of this specification, in which—

Figure 1:
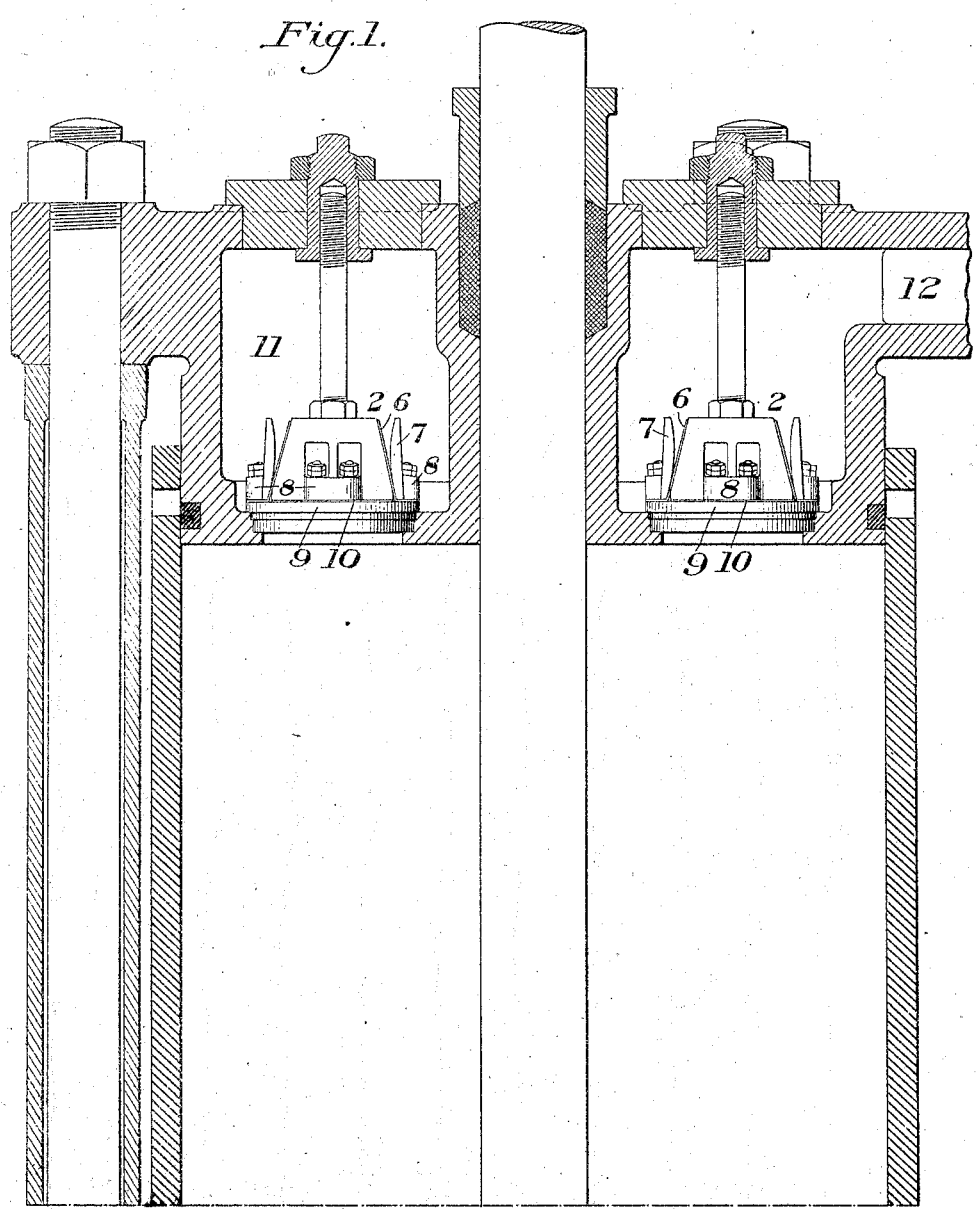
Figure 2:
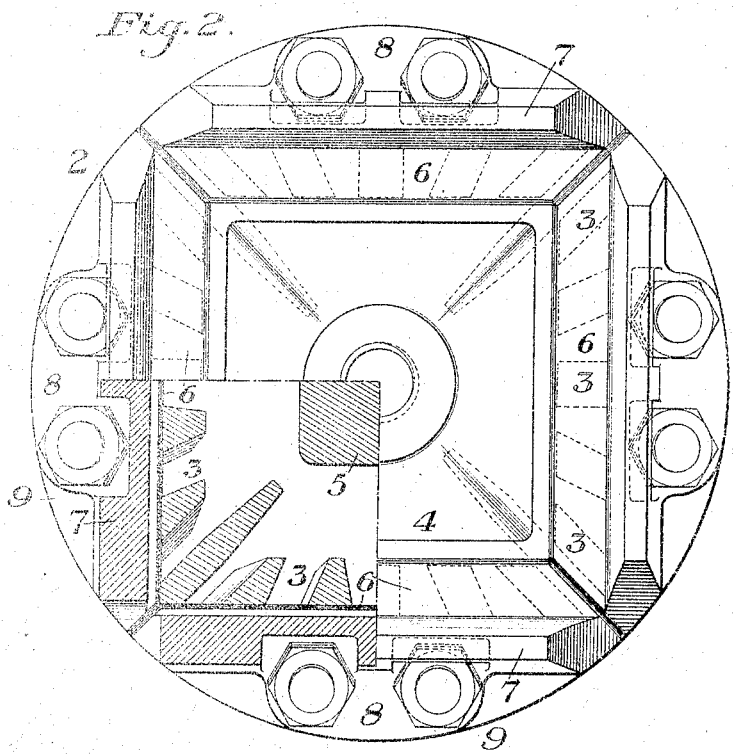
Figure 3:
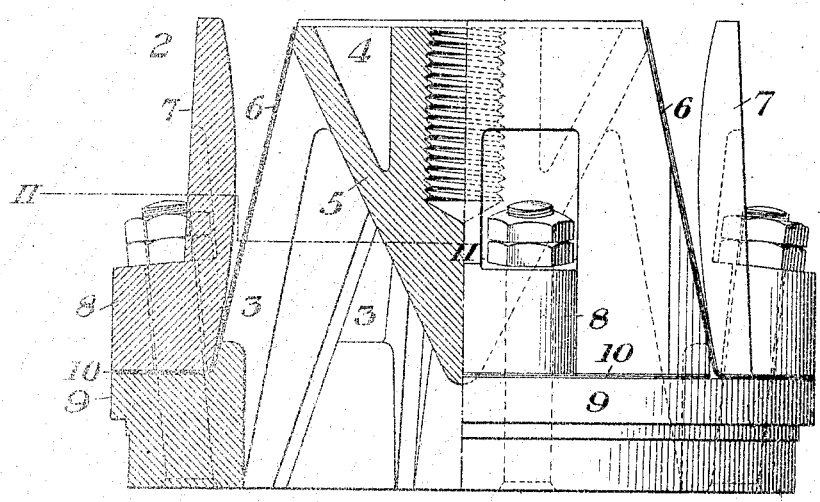

Figure 1 is a cross-section of the head of the blowing engine showing my improved valves in position; Fig. 2 is a plan view of one of the valves partly in section on the line II—II of Fig. 3; Fig. 3 is a side view of the same partly in section; and Fig. 4 is a side elevation of the valve cage with the back stops removed.

My invention relates to valves for blowing engines, compressors, pumps, etc., and is designed to provide a valve which will give a large port area; and also avoid sharp changes in the direction of flow of the fluid, whether water, air, or other fluid.

In the drawings, Figs. 2, 3 and 4 show in detail, the preferred form of one of my valves. The valve cage 2 is preferably in the form of a frustum of a pyramid having a series of flat inclined sides, of which there may be any desirable number, four being shown in the present instance. This cage is hollow, and each of its side faces is provided with slots 3, of which I have shown five in number, as in Fig. 4. The head 4 of the cage is solid, and is preferably provided with an inwardly-projecting ridge-shaped deflector 5. In the form shown, this deflector is of general pyramidal shape having flat sides, which aid in directing the current of air or other fluid through the side ports. This deflector avoids the presence of a dead air space within the cage, and also serves to direct the streams of fluid.

The ports for each face of the cage are controlled by flat valves 6 which are preferably in the form of thin flexible steel plates or sheets, of which there may be either one or more for each valve. In the present case I show two of these plates, and I prefer to use a plurality in this manner, as the valve is thus made stronger, while at the same time it is easily flexed back under the pressure of the fluid. In order to avoid the liability of breaking these valves by opening them backwardly too great a distance, I employ back stops 7 which preferably are provided with curved faces to contact with the valve as it is bent back in opening the ports. I have shown these back stops as provided with base flanges or blocks 8, by which they are bolted to the portion 9 of the cage. The valve plates are also preferably provided with flanges 10 which are held between the back stop and the portion 9 of the valve cage. These valves may, however, be secured in any other desirable manner.

In Fig. 1, 11 represents the hollow head of a blowing engine provided with my valves, 12 being the outlet to the receiver. Any desirable number of these valves may be employed in the head, depending on the size of the head, etc.

In the operation of the device, as the piston is moved toward the head containing these valves, the pressure of the fluid bends the valves backwardly against their back stops, and the streams of fluid flow longitudinally through the valve cages and ports into the inner box. As the piston moves in the opposite direction, the valves close by reason of their resiliency.

The advantages of my invention result from the large outlet area obtained, and also from the avoiding of sharp changes in the direction of flow of the fluid passing through the valves.

Many changes may be made in the form and arrangement of the valve cage, the valve, etc., and the valve may be employed either as an inlet or an outlet valve upon pumps, blowing engines, etc.

I claim:—

1. In a pump, a pump cylinder having a head or wall with an opening therethrough, a projecting cage secured over the opening and having at least three sides provided with side ports, and valves controlling said side ports, said valves having free outer ends arranged to move away from the cage walls in opening; substantially as described.

2. In a pump, a pump cylinder having a head or wall with an opening therethrough, a projecting cage secured over the opening and having at least three sides provided with side ports, and valves controlling said side ports, said valves comprising flexible sheets with free outer ends arranged to move away from the cage walls in opening; substantially as described.

3. In a pump, a pump cylinder having a head or wall with an opening therethrough, a projecting cage secured over the opening and having at least three sides provided with side ports, valves controlling said side ports, said valves having free outer ends arranged to move away from the cage walls in opening, and back stops arranged to limit the opening movements of the valves; substantially as described.

4. In a pump, a cylinder head or wall having an opening therethrough, a hollow cage secured over the opening and having side ports, a valve controlling said ports and comprising flexible plates secured at their inner ends with free outer ends coöperating with the side ports, and stops arranged to limit the backward movement of said sheets in opening; substantially as described.

5. In a pump, a cylinder head or wall having an opening therethrough, a hollow cage secured over the opening and having side ports, a valve controlling said ports and comprising flexible plates secured at their inner ends with free outer ends coöperating with the side ports, and curved stops arranged to limit the backward movement of said sheets in opening; substantially as described.

6. In a pump, a cylinder head or wall having an opening therethrough, a hollow cage secured over the opening and having side ports, said cage having a wedge-shaped deflector, valves coöperating with the side ports and comprising flexible metallic sheets secured at their inner ends and arranged to bend back away from the cage walls in opening, and back stops having curved faces arranged to limit the opening movement of the flexible valves, said valves forming parts of the port walls through which the air flows when the ports are open; substantially as described.

In testimony whereof, I have hereunto set my hand.

EDWIN E. SLICK.

Witnesses:
JOHN MILLER,
H. M. CORWIN.